(No Model.)
E. H. CRAM.
CURTAIN ROD BRACKET.
No. 595,560. Patented Dec. 14, 1897.
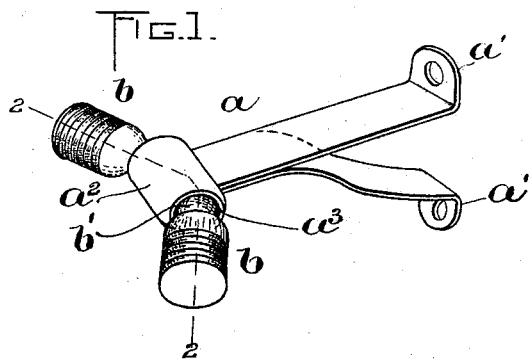
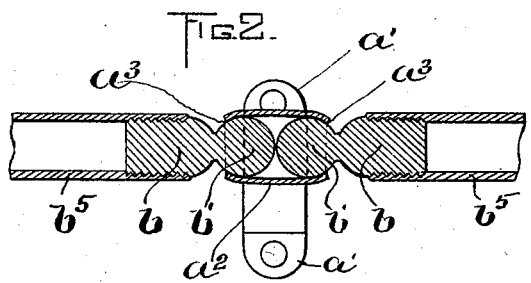
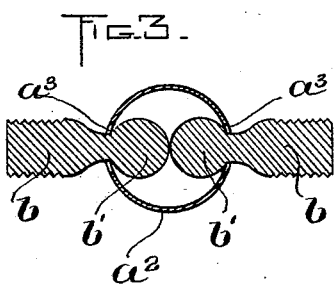

UNITED STATES PATENT OFFICE.

ELMER H. CRAM, OF WAKEFIELD, MASSACHUSETTS.

CURTAIN-ROD BRACKET.

SPECIFICATION forming part of Letters Patent No. 595,560, dated December 14, 1897.

Application filed March 31, 1897. Serial No. 630,105. (No model.)

*To all whom it may concern:*

Be it known that I, ELMER H. CRAM, of Wakefield, in the county of Middlesex and State of Massachusetts, have invented certain new and useful Improvements in Curtain-Rod Brackets, of which the following is a specification.

This invention has for its object to provide a simple and efficient device for supporting curtain rods or poles in the angles of bay-windows and wherever it is necessary to support two adjacent rods one at an angle with the other.

The invention consists in the improved device which I will now proceed to describe and claim.

Of the accompanying drawings, forming a part of this specification, Figure 1 represents a perspective view of my improved bracket. Fig. 2 represents a section on line 2 2 of Fig. 1. Fig. 3 represents a view similar to Fig. 2, showing a modification.

The same letters of reference indicate the same parts in all the figures.

In the drawings, $a$ represents a bracket which is formed at one end for attachment to a wall, window-casing, or other support, the bracket being here shown as provided with ears $a'a'$, adapted to receive attaching-screws. On the outer end of the bracket is a socket $a^2$, provided at opposite points with mouths or orifices $a^3 a^3$, which are less in diameter than the interior of the socket. The body of the bracket and the socket are preferably made of metal, although they may be constructed of any other suitable material and may be of any suitable form. The socket may be made of a short length of tubing having its ends slightly upset or contracted to make the diameter of the mouths or orifices $a^3$ less than that of the interior of the socket. If desired, the socket may be of the general spherical form shown in Fig. 3.

$b\,b$ represent two terminal members adapted to be connected to the ends of curtain rods or poles, said terminal members having spherical enlargements $b'$ at their inner ends, which enlargements are mainly inclosed in the socket $a^2$, the necks which connect them to the outer portions of the terminal members projecting from the mouths or orifices $a^3$ of the socket. The enlargements $b'$ are of greater diameter than the mouths or orifices $a^3$, so that they are prevented from slipping out through said mouths or orifices. The enlargements bear against each other at their inner ends to prevent either from slipping inwardly. It will be seen that the enlargements $b'$ and the socket $a^2$ constitute ball-and-socket coupling members, which permit the rods or poles attached to the members $b\,b$ to be adjusted at various angles with each other or to stand in line with each other. The device is therefore adapted particularly for use in supporting curtain-rods in bay-windows, although it may be used for supporting rods in alinement.

The members $b\,b$ may be connected to the rods or poles which they support in any suitable manner. I prefer to form external screw-threads on said members $b$ and screw upon them collars $b^5 b^5$, adapted to receive the ends of the rods, portions of the collars projecting from the members $b$ and forming sockets for the rods. It will be seen that the described device is extremely simple in construction and presents a neat and ornamental appearance. The terminal members $b\,b$ are permanently connected with the bracket, and the bracket and the terminal members connected thereto, as described, constitute an improved article of manufacture.

I claim—

An appliance of the character specified, comprising, first, a bracket formed at one end for attachment to a wall or casing and having at its other end a socket provided at opposite points with mouths or orifices which are smaller than the interior of the socket; and secondly, two terminal members having means for attachment to the ends of rods or poles, and substantially spherical enlargements of greater diameter than said orifices, the said enlargements being located within the socket and adapted to turn therein, and bearing against each other to prevent inward displacement of either enlargement.

In testimony whereof I have signed my name to this specification, in the presence of two subscribing witnesses, this 27th day of March, A. D. 1897.

ELMER H. CRAM.

Witnesses:
A. D. HARRISON,
P. W. PEZZETTI.